(12) United States Patent
Daniels et al.

(10) Patent No.: US 7,818,858 B2
(45) Date of Patent: Oct. 26, 2010

(54) POWER APPLICATOR SYSTEM FOR CONVEYOR BELT FASTENERS

(75) Inventors: William James Daniels, Orland Park, IL (US); Joseph Vogrig, Naperville, IL (US); Gregory Westphall, Naperville, IL (US); John H. Winkelman, Naperville, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 1306 days.

(21) Appl. No.: 11/147,993

(22) Filed: Jun. 8, 2005

(65) Prior Publication Data

US 2006/0000073 A1 Jan. 5, 2006

Related U.S. Application Data

(60) Provisional application No. 60/577,988, filed on Jun. 8, 2004.

(51) Int. Cl.
*B23P 11/00* (2006.01)

(52) U.S. Cl. ............. 29/243.51; 29/559; 29/525.05; 29/798; 227/147; 227/152; 227/155; 198/844.2

(58) Field of Classification Search .......... 29/798, 29/243.51, 283, 559, 525.01, 525.05; 227/151, 227/154, 155, 147, 152; 198/844.2
See application file for complete search history.

(56) References Cited

U.S. PATENT DOCUMENTS

| 4,065,045 | A | * | 12/1977 | Pray | 227/147 |
| 4,344,213 | A | * | 8/1982 | Pray | 29/243.5 |
| 4,380,109 | A | * | 4/1983 | Pray | 29/466 |
| 4,440,336 | A | * | 4/1984 | Kifor | 227/4 |
| 4,493,205 | A | * | 1/1985 | Ramey | 29/243.517 |
| 4,535,925 | A | * | 8/1985 | Ramey et al. | 227/55 |
| 4,688,711 | A | * | 8/1987 | Gladding et al. | 227/147 |
| 5,238,169 | A | * | 8/1993 | Herold | 227/147 |
| 5,244,088 | A | * | 9/1993 | Musil | 206/338 |
| 5,487,217 | A | * | 1/1996 | Richardson et al. | 29/816 |
| 5,524,808 | A | * | 6/1996 | Vogrig | 227/147 |
| 6,053,308 | A | * | 4/2000 | Vogrig et al. | 198/844.2 |
| 2004/0098926 | A1 | * | 5/2004 | Haytayan | 52/40 |

* cited by examiner

*Primary Examiner*—David P Bryant
*Assistant Examiner*—Christopher M Koehler
(74) *Attorney, Agent, or Firm*—Fitch, Even, Tabin & Flannery

(57) ABSTRACT

A system for applying belt fasteners to belt ends is disclosed. The system includes a power tool apparatus and a guiding apparatus. The guide apparatus includes a guide block having guide bores in which attachment members, e.g., rivets, are held in position relative to the belt fasteners so that a drive rod of the power tool impacts the rivets in the guide block bores. The guide block preferably is of a hard material, e.g. a machined steel or powder steel, for proper guiding of the drive rod and rivet during riveting operations.

20 Claims, 10 Drawing Sheets

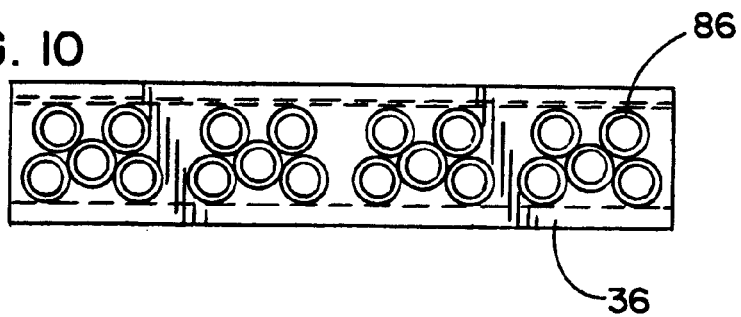
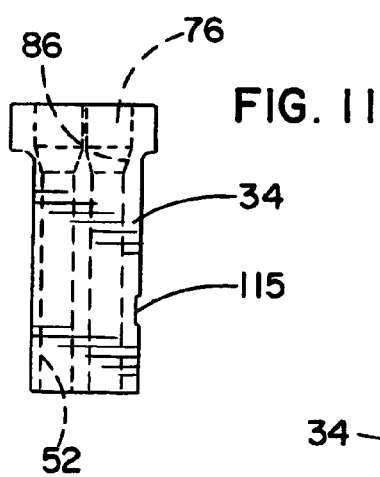
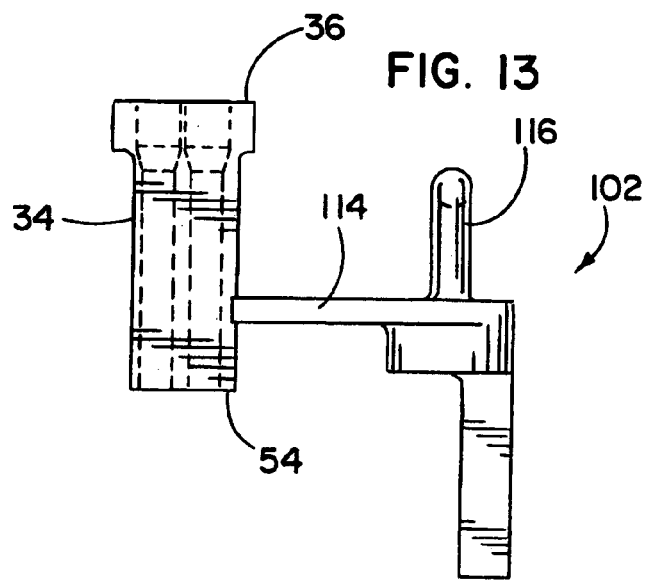
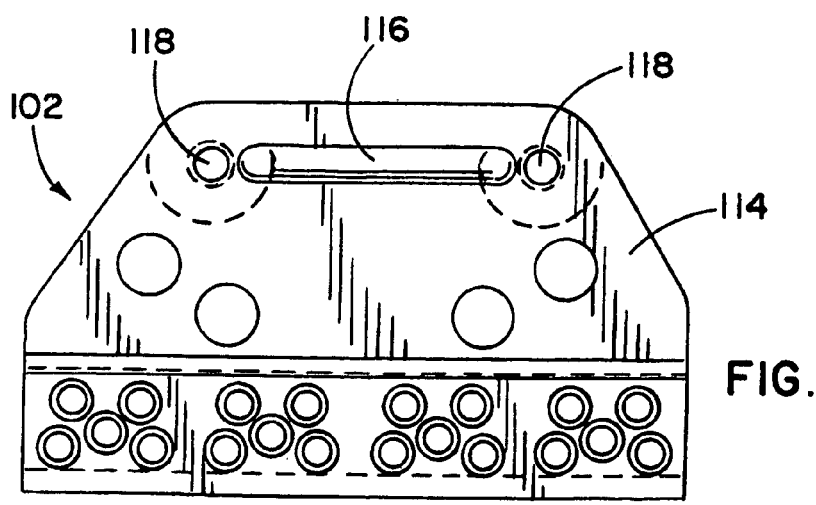

POWER APPLICATOR SYSTEM FOR CONVEYOR BELT FASTENERS

CROSS-REFERENCE TO RELATED APPLICATION

This application is based upon and claims the benefit under 35 U.S.C. §119 of prior provisional application No. 60/577,988, filed Jun. 8, 2004, which is hereby incorporated herein by reference in its entirety.

FIELD OF THE INVENTION

The invention is to an applicator system for attaching conveyor belt fasteners to belt ends and, more particularly, to an applicator system using a power tool for attaching belt fasteners to belt ends.

BACKGROUND OF THE INVENTION

Prior applicator systems are known for attaching rivet conveyor belt fasteners to belt ends either by using manual force as by hammer blows or with a power applicator, see U.S. Pat. No. 5,487,217 to Richardson et al. The '217 patent is addressed to the perceived need to provide easier installation of the rivet belt fasteners over that afforded by prior manual systems. Accordingly, the system of the '217 patent utilizes a non-manually powered rivet driving tool.

However, the power tool disclosed in the '217 patent requires a housing portion in which a supply strip of rivets is arranged for being fed to the drive barrel of the tool. As such, the rivets are carried in the tool itself adding to the bulk and weight of the tool making it more difficult to use. In addition, there are two different actuators or triggers that need to be operated while the user is holding the tool. More specifically, after the user has fired the actuator for driving a rivet out from the barrel of the tool and completed the riveting process with that driven rivet, to apply the next rivet, the user needs to operate a different actuator or trigger for advancing the next rivet in the strip into alignment with the drive barrel. Thereafter, the tool firing actuator is operated for advancing the drive rod so that it impacts the rivet in the tool drive barrel and advances it out therefrom for attaching the fastener to the belt end. Requiring a user to operate two different actuators for driving a rivet with the tool of the '217 patent slows installation time for the belt fasteners. Also, the advancing mechanism for the collated rivet strip in the '217 patent tool is prone to jamming further adding to installation delays and inconvenience to the user.

Another problem with a commercial tool provided by the '217 patent applicants is that it generally requires over approximately ten tool firings and impacts with the rivet for driving the rivet and forming the lower rivet head. The large number of rivet hits is due to the relatively low level of impact force generated by the power tool. While tending to avoid rivet breakage and deformation of the upper fastener plate as by dishing thereof, the time the tool takes to apply a rivet is unduly long. Further, to more easily allow a user to operate the tool to cause the drive rod to hit the rivet multiple times, a repeater mechanism is provided so that the user only needs to keep the firing trigger actuated or depressed for this purpose. However, the repeater mechanism adds undesirable cost and complexity to the operating mechanisms of the tool.

Accordingly, there is a need for an easier to use power tool and system employing such a tool for attaching conveyor belt fasteners to belt ends. More particularly, a power applicator system is needed for easy, fast and reliable powered driving of rivets for attaching belt fasteners to belt ends.

SUMMARY OF THE INVENTION

In accordance with one aspect of the present invention, a system for applying belt fasteners to belt ends is provided including a power tool and a guide block having bores in which rivets are received. Accordingly, the power tool impacts against rivets in the block bores, and not in the tool itself. In this manner, the tool does not carry a strip of rivets and does not need a separate actuating system therefor. To attach a fastener to a belt end, an operator need only align the tool relative to the block and operate a single actuator which causes a drive rod to advance into the through bore of the guide block for impacting the rivet therein and driving it out therefrom.

To provide the direct drive system described above, the system components are also provided with several unique aspects to enable and enhance system operation. In one aspect, a power tool apparatus is provided including a tool body having a drive barrel with a lower opening. Operation of the tool causes the drive rod to be advanced in the barrel with a large portion thereof extending out from the lower opening to engage a rivet external of the barrel. In this manner, the power tool drive rod can reach a rivet that is located in a through bore of a guide block, for instance. In addition, the power tool need not be provided with a housing portion and actuator mechanism for advancing a collated rivet strip in the gun, as has previously been discussed.

In another aspect, a guiding apparatus is provided including a guide block that has a body of a predetermined substantially hard and rigid material, e.g., steel. Through bores are formed in the body in which rivets are received for being impacted by a rod advanced through the bores. The hard and rigid material of the body acts to support the rod as it is advanced therethrough. Where the rod is a drive rod as in the previously described power tool, the hard and rigid material of the block body cooperates with the power tool drive barrel to support the rod for substantially the full length thereof during its driving stroke. Prior guide blocks of elastomeric material primarily used in manual hammer drive applications would not be useful in the present direct drive power system as the elastomeric material would not provide sufficient support to the drive rod to minimize drive rod bending and instances of breakage thereof and to ensure consistent and reliable rivet setting therewith.

In yet another aspect, the power tool is adapted for generating high impact forces, e.g., 50,000 lbs., against rivets in the guide block bores so that generally only two or three tool firings are needed to properly drive and set one of the rivets for attaching the belt fastener to a belt end. To allow for such high impact forces to be employed, the power applicator system limits the amount or distance the drive rod of the tool projects beyond the lower surface of the guide block after completion of its drive stroke. It has been found that by limiting this distance to preferably about 0.100 inch, with some excess travel provided by a resilient stop of the tool drive rod assembly, that the desired high force tool can be employed while minimizing instances of rivet breakage and limiting the dishing of the upper plate of the fastener accordingly during fastener installation operations.

BRIEF DESCRIPTION OF THE DRAWINGS

FIG. 10 is a plan view of the guide block showing four sets of through bores each arranged in a pattern matching that of the rivet pattern for the belt fasteners;

FIG. 11 is a side elevational view of the guide block of FIG. 10;

FIG. 12 is a plan view of the guide block including a lifting and locating portion attached thereto;

FIG. 13 is an elevational view of the guide block and attached lifting and locating portion of FIG. 12 showing an upstanding handle and a depending one of the locating posts thereof;

DETAILED DESCRIPTION OF THE PREFERRED EMBODIMENTS

Figure 1:
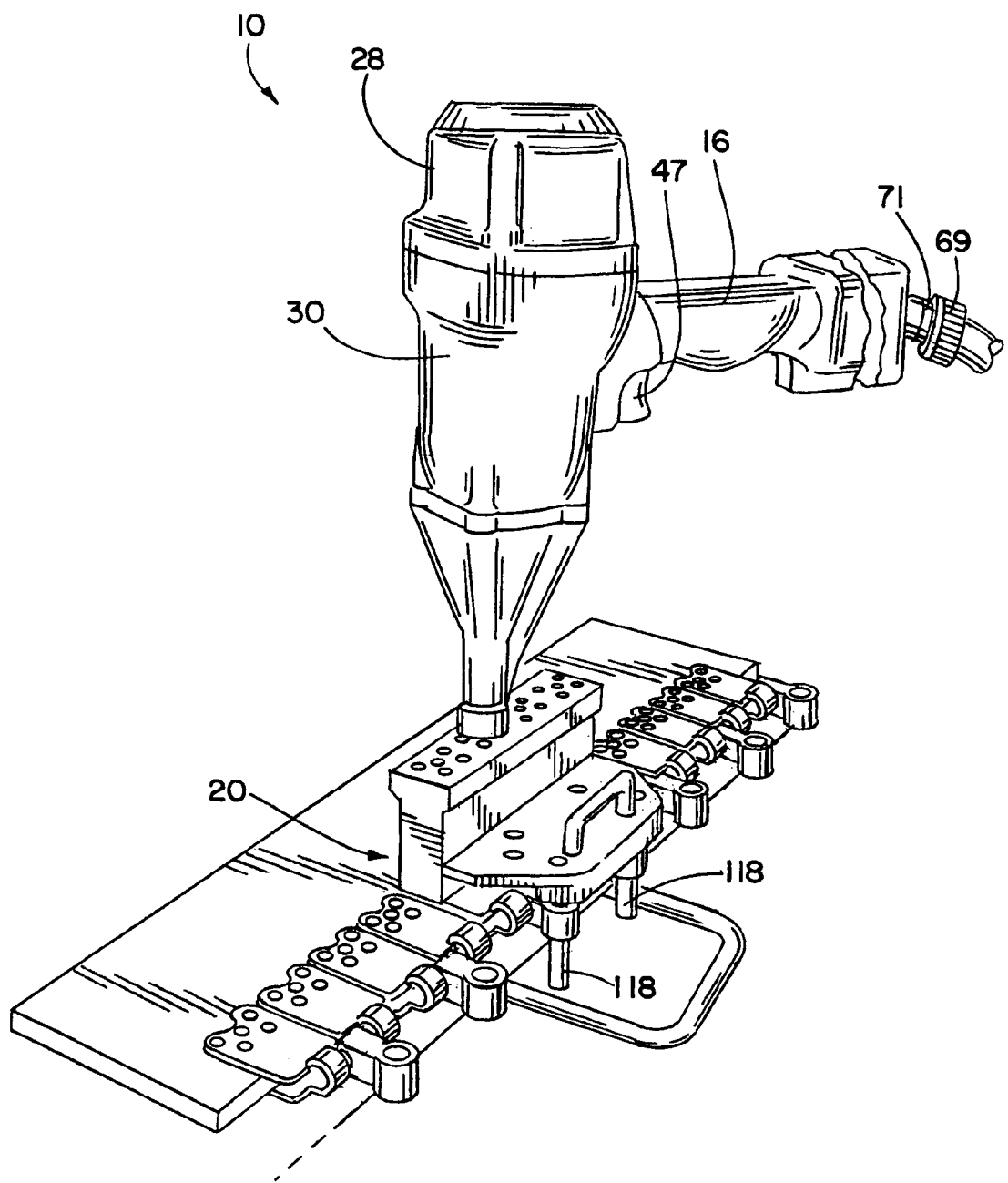
FIG. 1 is a perspective view of a power applicator system showing a power tool and a guide block aligned over belt fasteners on a belt end.

In FIGS. 1-5, a power applicator system 10 for attaching conveyor belt fasteners 12 to belt ends 14 is shown. The system 10 includes a power tool apparatus 16 and a guiding apparatus 18 that together cooperate in providing for ease of attachment of the belt fasteners 12 to the belt ends 14. The guiding apparatus 18 includes a guide block 20 having through bores 22 in which attachment members 24 (FIGS. 15 and 16) for the belt fasteners 12 are loaded. As shown, the attachment members 24 are preferably rivets, although other attachment members are also contemplated, e.g., nails or staples. In addition, the illustrated rivets 24 also include pilot nails 26 that are separably attached thereto, as is known. Accordingly, the term rivets herein are also meant to encompass rivets having separably attached pilot nails.

The power tool apparatus 16 herein includes a power tool or gun 28 that has a relatively compact lightweight body 30 as the tool 28 does not carry a strip of rivets in a housing portion thereof. Instead, in the present system 10 the rivets 24 are loaded in the guide block bores 22, as previously described. The power tool 28 can be in the form of a modified finish nailer, Model # CN890-2 of Max provided by Aerosmith out of Indianapolis, Ind. The tool 28 utilizes pneumatic power to generate a high impact force against the rivets 24 in the bores 22 for driving them out therefrom and through apertures 32 in the belt fasteners 12 and the carcass of the conveyor belt at the belt ends 14.

The guide block 20 is provided with a block body 34 that is sized so that the rivets 24 including the pilot nails 26 are sized to fit in the through bores 22 with there being a significant amount of space between the rivets 24 and the upper surface 36 of the block body 34. In this manner, different sizes of rivets 24 and/or pilot nails 26 can be employed in the present system 10 without requiring modifications to the power tool and guide block components thereof. In particular, in the prior commercial power rivet tool for conveyor belt fasteners that carry the collated strip of rivets therewith, different sizes of rivets require user implemented changes to the tool. Adapters are provided in a tool kit for changing the spacing of the operating mechanisms of the tool to accommodate the different sizes of rivets. In the present system where the rivets are received in the guide block bores 22, such a tool kit is unnecessary.

The power tool apparatus 16 is adapted to directly drive the rivets 24 with a drive rod 38 of the gun tool 28, however, with impact of the rod 38 against the rivets 24 occurring external of the tool body 30 in the guide block bores 22 where the rivets 24 are retained prior to belt fastener installation with the power applicator system 10 herein. Accordingly, a large portion 40 of the overall length of the drive rod 38 extends out from the tool 28, and specifically, a lower opening 42 provided in nose end 44 thereof when the rod 38 has completed its advancing drive stroke for setting the rivets 24 upon operation or firing of the power tool 28. Thus, along its length advanced out from the tool barrel or drive shaft 46 for the drive rod 38, the drive rod portion 40 will be unsupported by the barrel 46 in the tool body 30. In the direct drive system 10, the end 48 of the drive rod 38 engages the upper, enlarged rivet head 50 with a large impact force, e.g., on the order of 50,000 lbs., so that generally it only takes a single tool firing to drive the rivet 24 and associated pilot nail 26 through the belt carcass, and a second tool firing to form and set the lower rivet head (not shown).

Since there is a relative large unsupported column with operation of the preferred power tool 28 via the drive rod portion 40 advanced out from the tool barrel 46 unsupported thereby and with the high impact forces with which the drive rod 38 engages the rivet heads 50, the drive rod 38 and the guide block 20 are adapted so that the block body 34 provides support to the drive rod portion 40 that extends out from the tool barrel 46 during its drive stroke. In this manner, instances of failure of the drive rod extending portion 40 will be minimized. In addition, the drive rod 38 and the rivets 24 are maintained in proper alignment during the driving operation, i.e., with their respective longitudinal axes 38a and 24a substantially coaxial or coincident, such that misfires and instances of rivet breakage are kept to a minimum.

To this end, the block body 34 is formed of a predetermined hard and rigid material such as a metallic material, and in the preferred form a steel material. The rivets 24 are received in the bores 22 so that they are disposed in a rivet guiding portion 52 thereof. The rivet head 50 has a diameter that is sized for a close fit relative to the diameter of the rivet guiding portion 52 of the bores 22. Similarly, the drive rod extending portion 40 also has a diameter that is modified to be enlarged relative to the drive rod size in the commercial Max nail gun so that it has a close fit with the diameter of the rivet guiding portion 52 of the bores 22. By way of example and not limitation, the bore portions 52 can have a diameter of approximately 0.328 inch, the drive rod portion 40 can have a diameter of approximately 0.310 inch, and the rivet heads 50 can have a diameter of approximately 0.312 inch. In this manner, the steel walls of the block body 34 extending about the bores 22, and specifically about the respective rivet guiding portions 52 thereof, provide sufficient rigid support to the drive rod extending portion 40, to keep it from bending and breaking during high force impacts with the rivets 24 and high force driving of the rivets 24 in the bore portions 52.

Similarly, the bore walls provide rigid support to the rivets 24 so as to keep them aligned with the drive rod portion 40 during the high impact and high force driving operation described herein. In other words, as the drive rod portion 40 impacts the rivets 24 and drives them in the bore portion 52, the rigid wills of the block body 34 about the bores 22 substantially prevents any skewing of the drive rod portion 40 and rivets 24 so that their axes 38*a* and 24*a* become misaligned and are no longer coincident with each other. Instead, the rigid bore walls are able to keep the drive rod portion 40 and the rivets 24 properly aligned during the impact between the drive rod end 48 and the rivet head 50 and as the rivet 24 and the pilot nail 26 thereof are driven through the belt carcass. Unlike prior elastomeric blocks that would more likely allow skewing with such high impact forces, the rigid material of the block body 34 and close fit of the bores 22 with the drive rod 38 and rivets 24, and specifically between the bore portions 52 and the rod extending portion 40 and rivet heads 50, keep the drive rod portion 40 from bending, and also keep the drive rod portion 40 and rivets 24 in alignment during the drive stroke of the drive rod 38.

Figure 5:
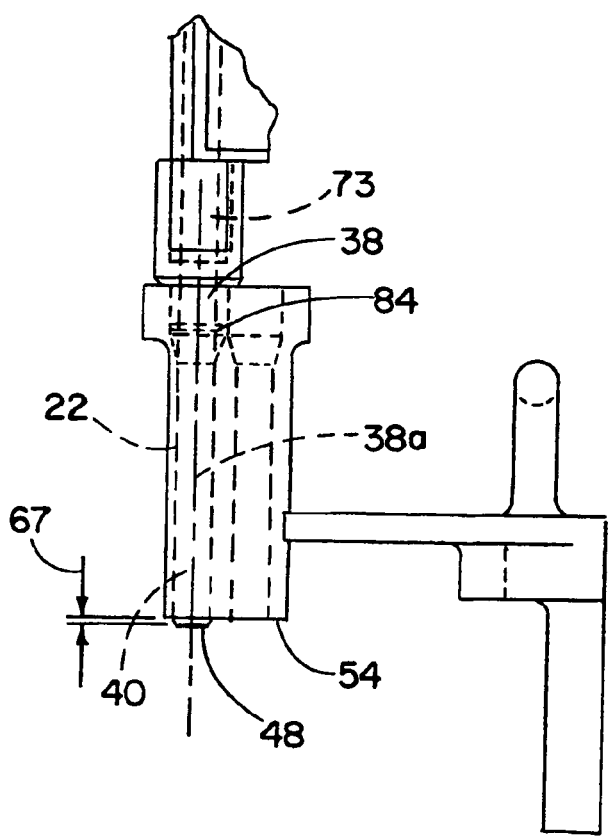
FIG. 5 is an elevational view similar to FIG. 4 showing the nose end registered in the guide bore with the drive rod advanced out from the nose end and extending through the guide bore to project out from the lower end thereof.

One consideration with the high impact forces generated by the preferred pneumatic tool 28 herein is the increased risk of rivet breakages and also of adverse fastener plate deformation. More particularly, after its advancing drive stroke is complete, the drive rod 38 extends out from the bottom of the through bores 22 so that there is a small portion that projects beyond the lower surface 54 of the block body 34, as can be seen in FIG. 5. The problems that have been identified when the drive rod 38 is allowed to extend too far beyond the lower surface 54 out from the bottom of the bores 22, e.g., on the order of approximately 0.250 inch, are increased incidences of rivet breakage and undue deformation or dishing of the fasteners 12, and specifically of the upper plate 56 thereof.

Figure 2:
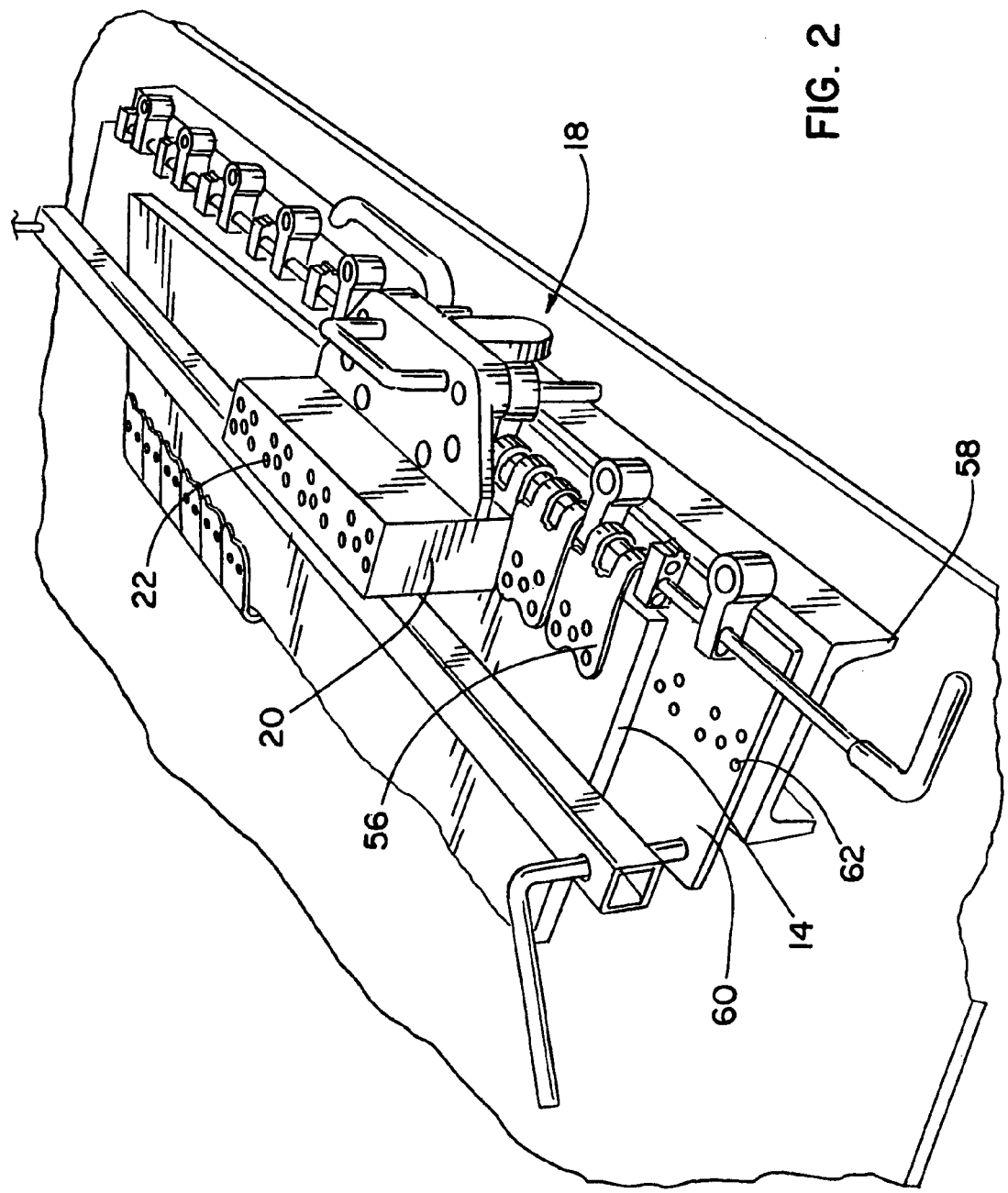
FIG. 2 is a perspective view similar to FIG. 1 with the power tool removed showing upper openings to a plurality of through bores formed in the guide block.
Figure 3:
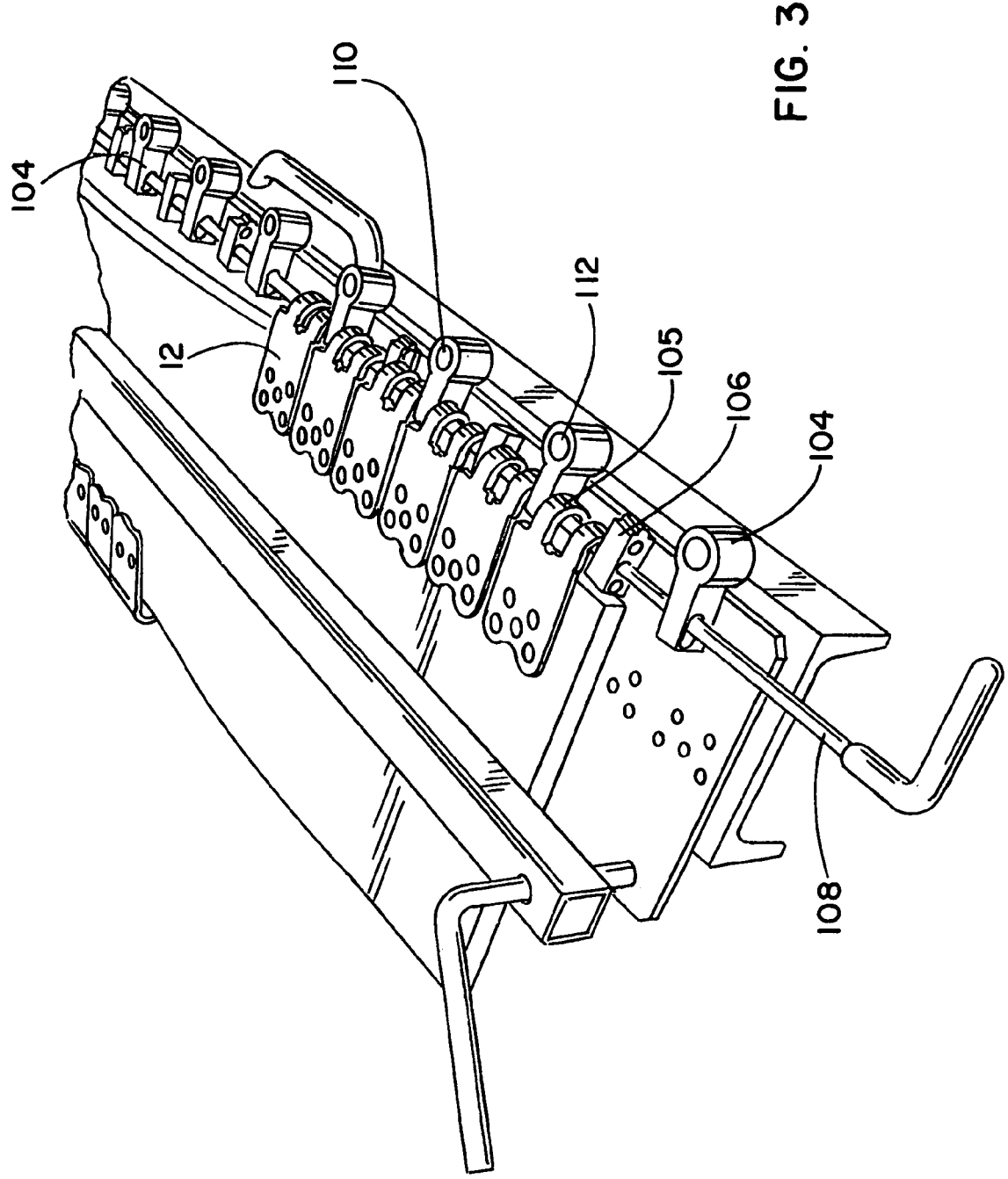
FIG. 3 is a perspective view of the conveyor belt fasteners riveted to the belt end.

Referring more specifically to FIG. 2, the applicator system 10 includes a U-channel base member 58 with an anvil plate 60 provided on the upper surface thereof. The anvil plate 60 has sets of die bushings 62 mounted to the anvil plate 60 in the same pattern as the rivet apertures 32 in the fastener plates (only upper plate 56 shown) and as the rivet receiving bores 22 of the guide block 20. As seen best in FIG. 15, the pilot nails 26 include a radially enlarged flange 64 toward their upper ends at the juncture with the lower ends 66 of the associated rivets 24.

When the rivets 24 and pilot nails 26 are driven through the belt end 14, the pilot nail 26 travels through the die bushing 62 in the anvil plate 60 until the nail flange 64 abuts the bushing 62. Continued driving of the rivet 24 causes the lower end 66 to be deformed or upset as it curls radially outward and upward by cooperation of the nail flange 64 and die bushings 62 to form the lower rivet heads in apertures in the lower plate of the belt fasteners 12. The problem of rivet breakage occurs with continued driving of the rivets 24 with too great of a force for forming the upset rivet heads. In other words, if after the nail flanges 64 have been driven to seat against the bushings 62 there is continued high force vertically downward shifting of the lower ends 66 of the rivets 24 against the nail flanges 64 and die bushings 62 for too great of a distance, they are likely to fail and break rather than form a properly set lower rivet head. Accordingly, such action will more likely occur if the high force pneumatic tool 28 herein has its drive rod 38 improperly sized relative to the guide block bores 22 so as to project too far beyond the lower surface 54 thereof, as previously discussed.

Another problem arises with high force application of multiple rivets 24 one at a time to a single belt fastener 12. In this instance, if the drive rod 38 extends beyond the guide block lower surface 54, the rod 38 will drive the fastener upper plate 56 via engagement with the rivet head 50 in one of the plate apertures 32 with sufficient force such that the belt carcass undergoes significant compression in the area about the driven rivet and between the fastener plates. And since the lower fastener plate rests on the anvil plate member 60, the local compression of the belt carcass causes the belt material surrounding the compressed material to push upwardly on the upper plate 56 deforming the fastener upper plate 56 so as to cause a dish-like depression therein.

When the plate 56 is dished, there is a raised surface that is established on which the guide block lower surface 54 rests. It has been found that this dishing will substantially correspond to the amount the drive rod 38 extends beyond the block lower surface 54, assuming a smooth belt surface for attaching the fasteners 12 thereto. When such dishing approaches approximately 0.250 inch, it can create problems with subsequent rivet driving. Subsequently driven rivets will not be properly attached to the fasteners 12 since the upper rivet heads 50 will not be fully seated in the rivet apertures 32 and/or the lower rivet head will not be properly formed. In either case, the strength of the attachment of the belt fasteners 12 to the belt ends 14 or the fastener P.I.W. (pounds-per-inch of belt width) capacity can be seriously compromised. Further, the dished plate 56 and raised rivet heads 50 also provide undesirable projections off from the belt surface which can create catch points for the belt splice as it travels passed cleaners and other belt accessories possibly prematurely destroying the splice.

Accordingly, in the preferred form the maximum amount the drive rod 38, and specifically the drive rod extending portion 40, projects beyond the guide block lower surface 54 is predetermined and limited so as to substantially avoid damage to driven rivets 24 and to substantially correspondingly limit any deformation or dishing of the belt fastener upper plates 56 that may occur. Referring to FIG. 5, this axial length of the projecting portion of the drive rod 38 is designated with reference number 67. Herein, this distance 67 is preferably less than approximately 0.100 inch. It has been found that when the projecting amount 67 of the drive rod 38 is set at 0.100 inch even with the high impact forces generated by the power tool 28 herein, the rivets 24 are properly driven and set for attaching the fasteners 12 to the belt ends 14 and any deformation to the fastener upper plates 56 is limited so as to avoid the problems excessive dishing can cause as described above. Moreover, with the projecting amount 67 of the drive rod limited as described, it has been found that the tool 28 can be operated with a variety of source pressures such as in the range of 60 to 120 psi. In this regard, the tool apparatus 16 includes an air line 69 for being connected to a shop air source and a high pressure hook-up mechanism 71 between the tool body 30 and the line 69, as shown in FIG. 1. Further, the rivets 24 for a particular fastener 12 can be driven in substantially any sequence and the rivets can of various sizes without affecting the quality of the rivet set and the attachment of the fasteners 12 to the belt ends 14.

It is also possible to have the drive rod 38 project beyond the guide block lower surface 54 by less than the preferred limit of 0.100 inch while still ensuring that the rivets 24 are driven properly for fully seating its upper rivet head in the fastener aperture therefor and for forming the upset head at the lower end 66 thereof. It should be noted, however, that upon completion of its drive stroke, the end 48 of the rod 38 should project beyond the block lower surface 54 and not be flush therewith. In particular, it is anticipated that the amount 67 the drive rod is set to project from the lower ends of the through bores 22 will be determined by several factors including the belt material and whether or not there is a skived or smooth surface on which the belt fasteners 12 are to be attached. With a more uneven belt surface such as due to belt wear in the central, material carrying area thereof, there will be a need to go higher in the range of projecting distances for the drive rod 38 so that the rivets 24 are engaged and properly driven for setting the rivet heads in their respective apertures. On the other hand, with more of a smooth surface it may be possible to reduce the amount of the drive rod 38 projects out from the through bores 22 after completion of its full driving stroke closer to a minimum distance, e.g., 0.010 inch or less.

Figure 9:
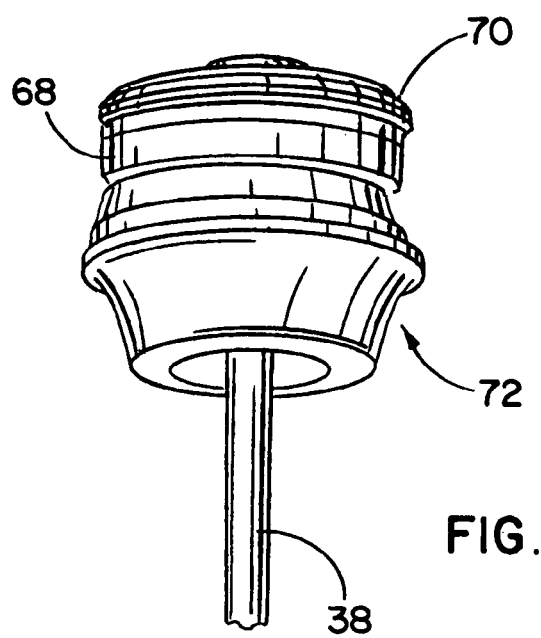
FIG. 9 is a perspective view of a drive rod and piston assembly of the power tool showing an elastomeric stop member through which the drive rod extends.
Figure 14:
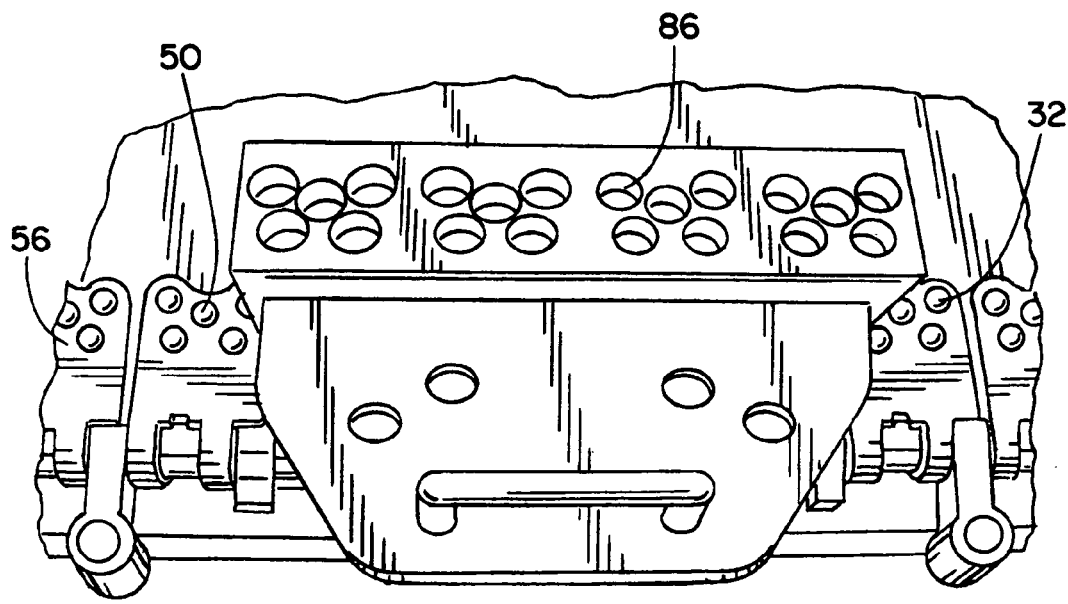
FIGS. 14-17 are perspective views showing the procedures for locating the guide block over the fasteners on a belt end and placing collated rivets on the block for being loaded in the bores of the block in alignment with apertures of the fasteners.

With respect to the amount 67 the drive rod 38 is limited in extending out from the through bores 22, it should be noted that in practice there will be a certain amount of play in the preferred distances provided. Referring to FIG. 9, a piston 68 is secured to the upper end of the drive rod 38. When a user operates the tool by pulling on the firing trigger 47, compressed air is supplied to the backside of the piston 68 causing the piston 68 and attached drive rod 38 to advance through the barrel 46. For this purpose, the piston 68 is sized in close fit with the diameter of the barrel 46 with annular seal 70 in rubbing engagement with the walls of the barrel 46 to substantially prevent leakage of air passed the piston 68. In this manner, the portion 73 of the drive rod 38 that does not extend out from the barrel opening 42 during the drive stroke is supported in the barrel 46 by the piston 68 in engagement with the walls of the barrel 46.

Continuing reference to FIG. 9, an annular stop member 72 is fixed in the barrel 46 adjacent the tool nose end 44. The piston 68 is normally spaced from the stop member 72 when the drive rod 38 is fully retracted in the barrel 46 prior to tool firing. Once the tool is fired, the drive rod 38 advances through the annular stop member 72 and the piston 68 advances in the barrel 46 until it abuts against the stop member 72. The stop member 72 is preferably of a resilient material, e.g., an elastomeric material, so that the energy of the high impact engagement with the piston 70 is absorbed thereby avoiding piston damage. As shown in FIG. 9, the drive rod 38 is fully advanced with the piston 68 abutting the stop member 72. In this static position, the drive rod 38, and specifically the drive rod extending portion 40 is sized relative to the guide bores 22 so that the rod end 48 projects beyond the guide block lower surface 54 by the limited distance 67, as previously described. However, during the firing of the tool 28 when the piston 68 abuts against the stop member 72, there will be some resilient give in the stop member 72, so that the predetermined projecting amount 67 of the drive rod portion 40 will be exceeded for a short duration. Thus, herein it is contemplated that the preferred range for the amount of the drive rod portion 40 projecting beyond the block surface 54 will also include added thereto the extra play provided by the resilient stop member 72 when such is present in the tool 28.

To achieve the preset distance 67 desired for the drive rod projecting end 48 relative to the guide block lower surface 54, the effective length of the drive rod 38 relative to the length of the guide block through bores 22 is closely coordinated. In this regard, the tool nose 44 is preferably configured to register or fit into an upper portion 76 of the guide block bores 22 so that the fully extended drive rod portion 40 need not traverse the entire length of the block bores 22 for projecting out from the lower ends thereof. As can be seen in FIG. 5, the tool nose 44 projects into the upper portion 76 of the bores 22 with an insertion depth that is greater than the drive rod projecting amount 67 relative to the block surface 54 so that the length of the fully extended drive rod portion 40 is less than that of the full length of the through bores 22. By way of example and not limitation, the length of the guide bores 22 can be approximately 3.0 inches, and the length of the fully extended drive rod portion 40 can be approximately 2.70 inches. In this instance, the drive rod end 44 projects from beyond the guide block lower surface 54 by 0.100 inch.

As mentioned above, the nose 44 of the gun 28 and the upper portion 76 of the guide bores 22 are configured to allow the gun nose 44 to register therein. Referring more specifically FIGS. 4, 5 and 8, it can be seen that the gun nose 44 is formed with a lower, smaller diameter insertion portion 78 having an annular configuration for defining the lower opening of the tool drive shaft or barrel 46. The nose 44 also includes a larger diameter portion 80 such that there is a radially extending shoulder surface 82 extending between the nose portions 78 and 80. The upper, nose end receiving portion 76 of the bores 22 is of a slightly larger diameter then the nose insertion portion 78 to allow it to snugly fit therein but of a smaller diameter than the nose upper portion 80. Accordingly, with the nose portion 78 fully received in the bore portion 76, the nose shoulder surface 82 will abut flush against the flat upper surface 36 of the block body 34, as shown in FIG. 5. In this manner, when the nose surface 82 is in flush abutment with the block surface 36, the user will have a tactile indication that the gun tool 28 is in proper position and orientation relative to the rivets 24 in the guide block bores 22 for a firing operation to take place.

In addition, the axial length of the upper bore portion 76 is longer than that of the lower, nose insertion portion 78 so that with the surfaces 36 and 82 engaged, the distal end 84 of the nose 44 will remain raised relative to the axially inner or lower end of the bore portion 76 in which it has been inserted. This is advantageous because in the preferred and illustrated form, the upper portions 76 of the bore 22 are counterbored to have a larger diameter than the lower, rivet receiving bore portions 52. Accordingly, by sizing the nose portion 78 to have a smaller axial length than the bore portion 76, the nose end 84 does not abut against a narrow diameter surface in the bores 22 each have the nose 44 is inserted in the bore portions 76 so as to avoid potential damaging contact therewith.

Figure 4:
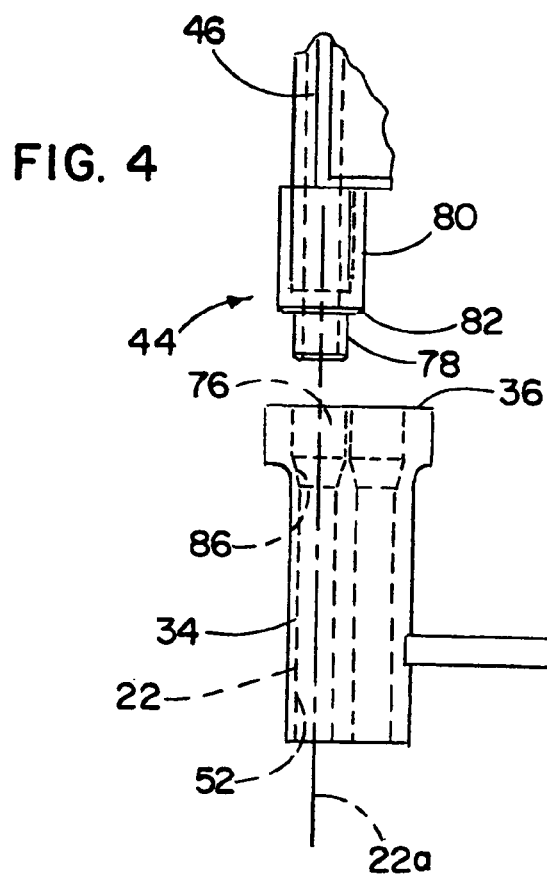
FIG. 4 is an elevational view of a nose end of the power tool aligned with one of the guide bores of the guide block.

It is preferred that the transition surface 86 between the large diameter bore potion 76 and smaller diameter rivet guiding portion 52 be tapered, as can be seen best in FIGS. 4 and 5. Thus, when the nose portion 78 is fully received in the bore portion 76, the nose end 84 will be spaced from the tapered surface 86, as shown in FIG. 5. The tapered surface 86 also provides for easy insertion of the preferred rivets 24 herein. Referring to FIGS. 14-17, it can be seen that the rivets 24 are provided with a lower guide member 88 that assists in keeping the rivets 24 properly oriented in the through bores 22 with their axes 24a coincident with the bore axes 22a. The guide member 88 is in the form of an annular washer that is sized to be frictionally held on the rivets 24, and specifically on the pilot nails 26 thereof, although the guide members 88 could also be located on the rivets 24 themselves.

The rivets are collated so as to be releasably carried by a molded strip 90 including several plate portions 92 as described in applicants assignee's co-pending U.S. patent application Ser. No. 10/823,878, which is hereby incorporated by reference as if reproduced in its entirety herein. As shown, the block body 34 is provided with four sets of through bores 22 each arranged in a pattern similar to the pattern of rivet apertures 32 in the belt fasteners 12. Accordingly, the collated strip 90 carries the rivets 24 so that they are also arranged in the same pattern as the bores 22 and belt fastener apertures 32.

With four sets of rivets 24 carried by the collated strip 90 and with five rivets 24 in a set as carried by a plate portion 92, the collated strip 90 allows a user to simultaneously load twenty rivets 24 into the corresponding number of through bores 22 formed in the block body 34. Manifestly, the number of sets of rivets 24 and number of rivets 24 in a set can vary widely from that shown herein. For instance, it is also contemplated that eight rivet fasteners 12 could be installed with the system 10 so that each of the four plate portions 92 has eight rivets depending therefrom with a corresponding number of through bores 22 formed in the block body 34 and apertures 32 in the fastener plates. Accordingly, in this instance, the collated strip 90 would allow a user to substantially simultaneously insert thirty-two rivets 24 in the block bores 22.

Figure 15:
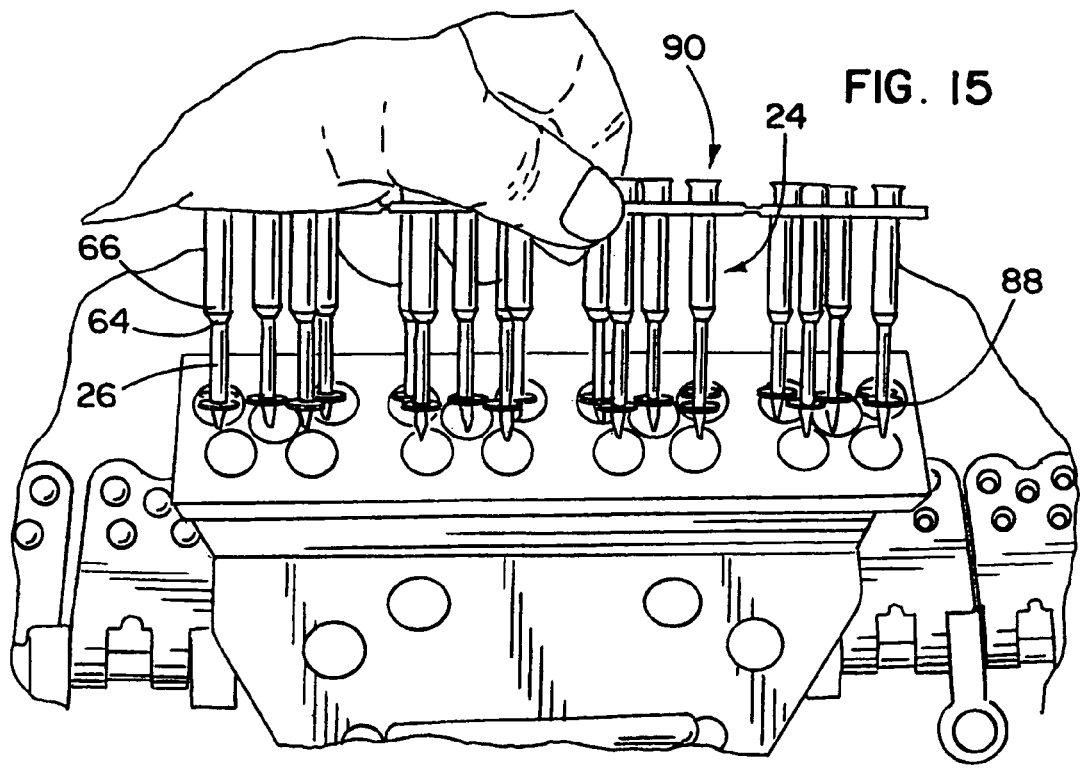
Figure 16:
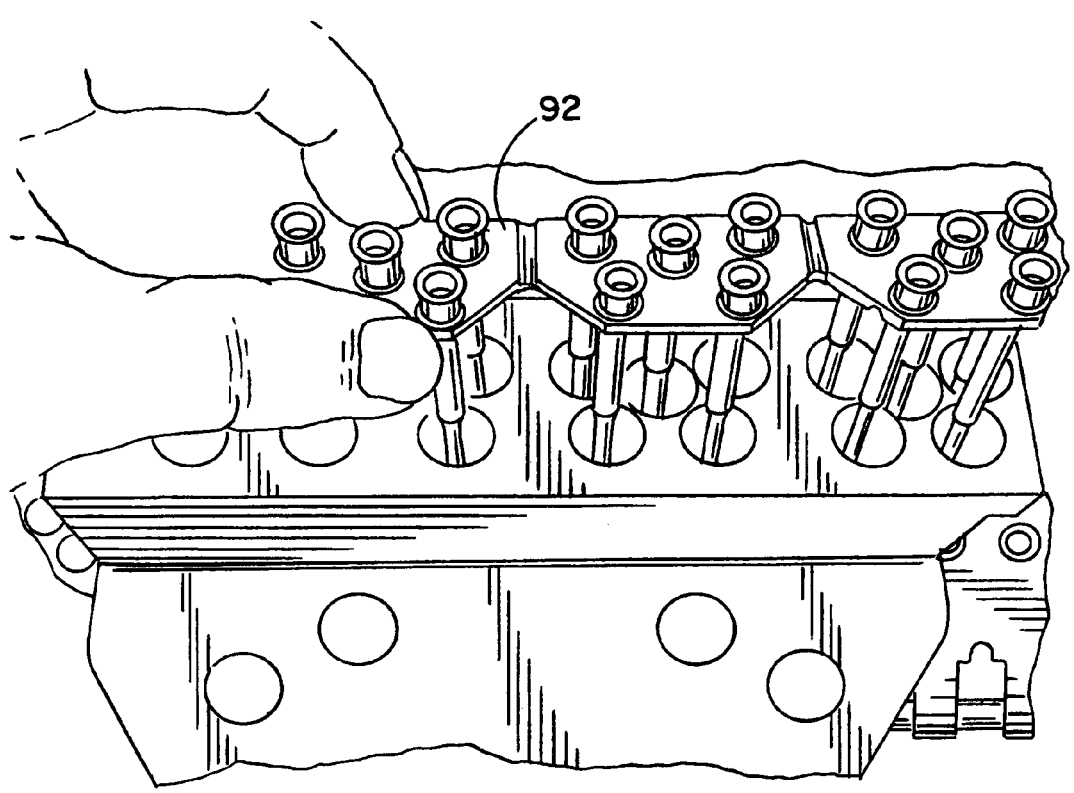
Figure 17:
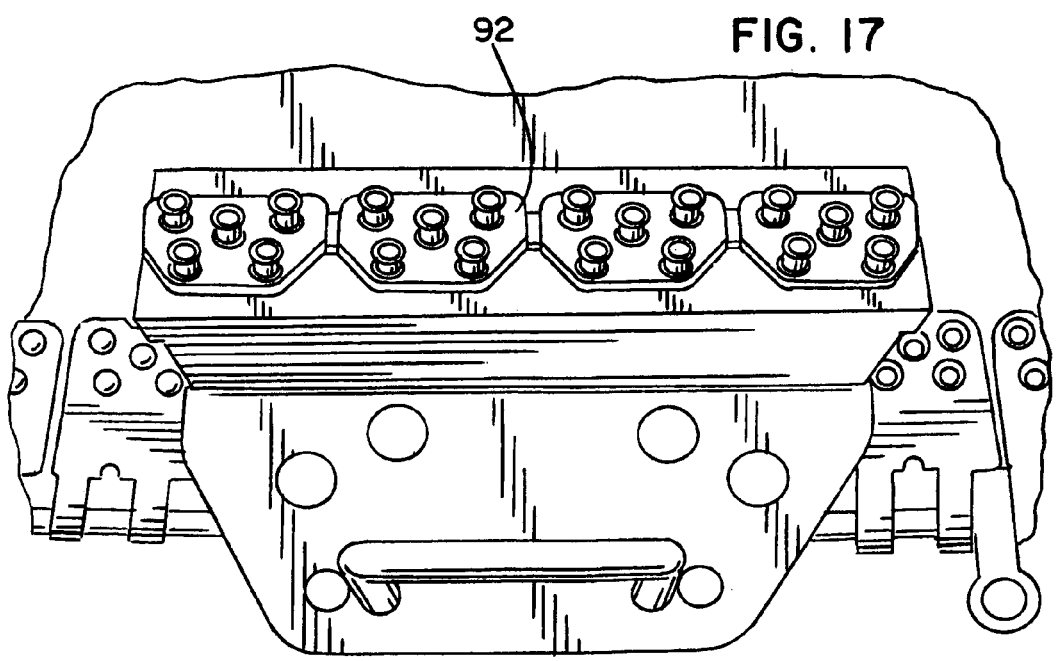

The washer guide members 88 are closely sized to have an outer diameter that is approximately the same as that of the diameter of the lower bore portions 52 so that there is a close slide fit therebetween, similar to the upper rivet head 50. With the exemplary dimensions previously provided for the bore portions 52 and rivet heads 50, the washer members 88 preferably have a diameter of approximately 0.312 inch. Thus, the upper rivet head 50 and the guide member 88 are provided with a similar diameter for keeping the rivet properly aligned in the bore portion 52. With the relatively large number of rivets 24 that are simultaneously inserted into the bores 22 via the collated strip 90, it would be very difficult and time consuming to try to properly align all of the rivets 24 including the guide members 88 thereon with the bore portions 52 without the provision of the tapered, lead in surface 86 in the bores 22. In other words, if instead of the transition, tapered surface 86, a radially extending shoulder was provided between the bore portions 52 and 76, it is likely that several rivets 24 would get hung up on such a radial surface in the bores 22 due to the presence of the radially enlarged guide members 88. On the other hand, with the tapered surface 86 leading the rivets 24 and nails 26 into the lower rivet receiving bore portion 52, it has been found that a user is able to slide all of the rivets 24 relatively freely and easily into position in the bores 22, and specifically down into the lower rivet receiving portions 52 thereof, as shown in FIGS. 15-17.

Figure 6:
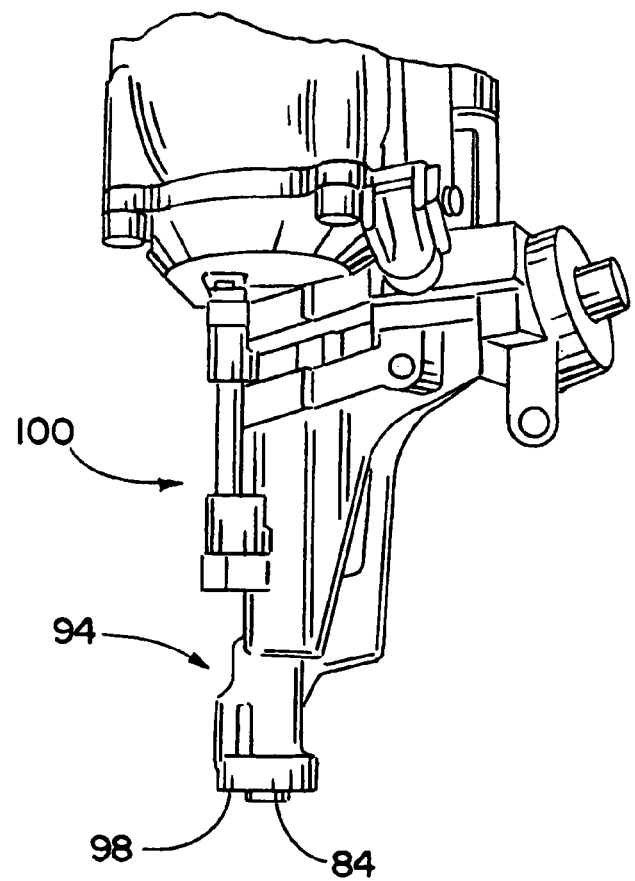
FIGS. 6-8 are perspective views of the power tool showing a sheath of a safety mechanism that extends about the tool nose end.
Figure 7:
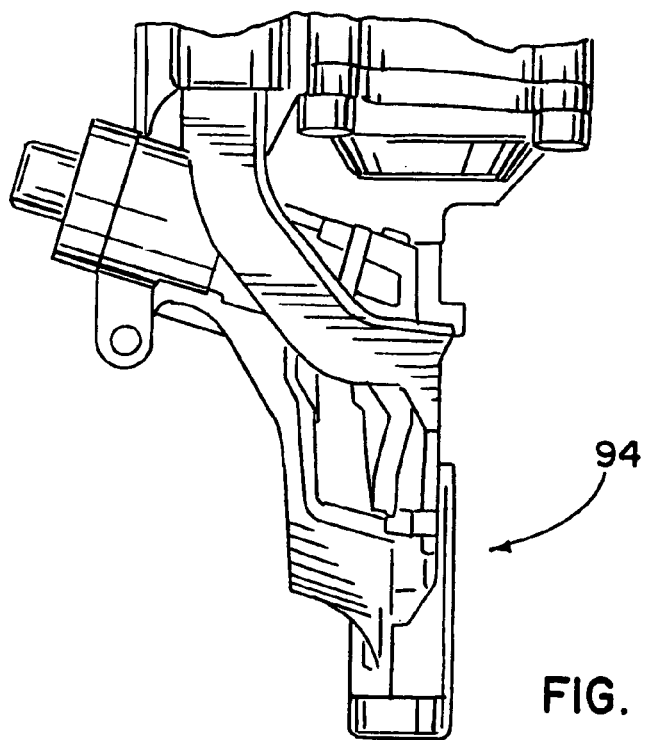
Figure 8:
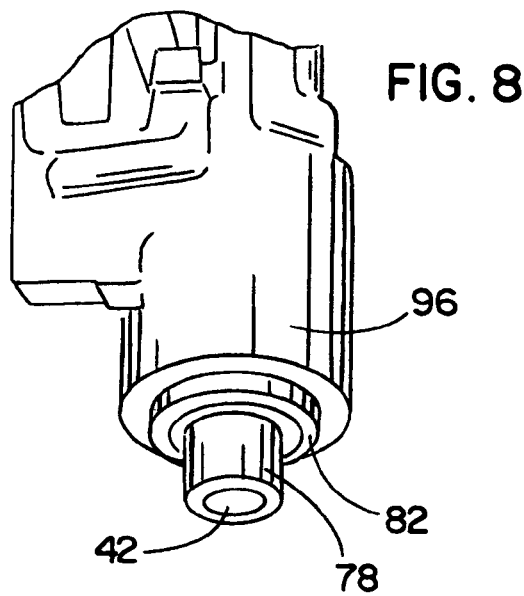

Turning to more of the details, a safety mechanism 94 of the gun power tool 28 is depicted in FIGS. 6-8. As shown, the safety mechanism 94 includes a lower, retractable shroud 96 having a cylindrical configuration for substantially surrounding the tool nose 44. As best seen in FIG. 6, the nose end 84 projects slightly beyond the end 98 of the shroud 96 to allow a user to easily locate the nose lower portion 78 into the bore upper portions 76 of the guide block 20. However, prior to full insertion of the nose portion 78 and bore portion 76, the shroud end 98 will engage the guide block upper surface 36. The safety mechanism 94 including the shroud 96 is spring biased to the lowered position shown in FIG. 6. In this position, the gun firing mechanism is disabled.

Once the shroud end 98 is engaged against the block surface 36, continued insertion of the nose portion 78 into bore portion 76 causes the safety mechanism 94 to be retracted upwardly against its spring bias. FIG. 8 shows the safety mechanism 94 pulled back against its spring bias to expose the nose shoulder surface 82. When the nose shoulder surface 82 is engaged against the block surface 36 such that the shoulder surface 82 and shroud end 98 are substantially level with each other, the safety mechanism 94 and particularly upper portion 100 thereof will have shifted sufficiently upward to open an operating valve (not shown) of the firing mechanism in the gun body 30 to enable the gun firing mechanism. Accordingly, with the firing mechanism enabled, the user can operate the trigger 47 to cause a firing of the tool 28 for a riveting operation. Thus, the length of the gun nose portion 78 less the amount projecting beyond the end 98 of the non-retracted shroud 96 is coordinated to correspond with the amount of travel of the safety mechanism 94 required to enable a gun firing operation.

Figure 8A:
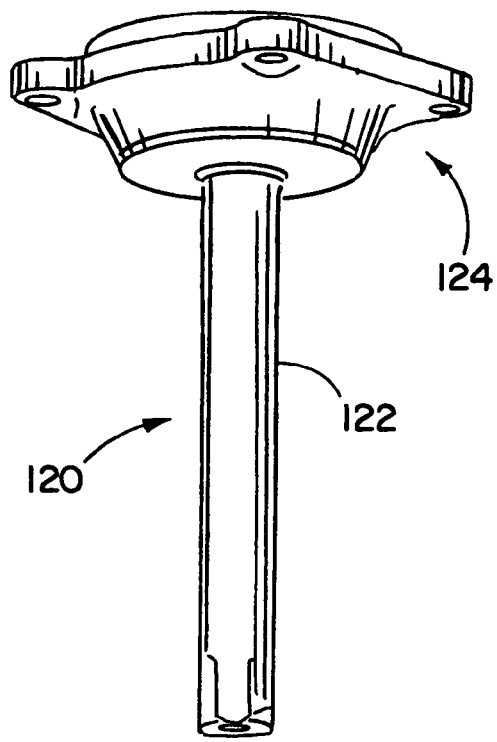
FIG. 8A is a perspective view of a drive shaft for the drive rod.

FIG. 8A depicts an alternative drive shaft 120 for the drive rod 38. The drive shaft 46 is substantially similar to that used for the Max commercial finish nailer. As can be seen in FIGS. 6-8, it has a hinged construction to provide access to the coil of nails that are individually advanced to the shaft 46 for being impacted therein. Since such an advancing mechanism is rendered unnecessary by the present tool 16 that impacts the rivets 24 outside of the tool shaft 46 thereof, having two hinged together half-cylindrical bore parts for forming the tool shaft 46 is also unnecessary. Accordingly, the preferred tool shaft 120 has a unitary construction including a cylindrical wall 122. The cylindrical wall 122 can be provided with a nose at its distal end configured similar to previously-described nose 44 for being located in the guide bores 22. At its upper end, a flange cap 124 is provided for bolting the drive shaft 120 to tool body 30 in a manner similar to that shown in FIGS. 6 and 7. The shaft 120 preferably will also include a safety mechanism associated therewith akin to previously described safety mechanism 94. Nevertheless, it is apparent by eliminating the pneumatic advancing mechanism including the hinged drive shaft construction, the body 30 of the tool 16 will have less weight and be easier to use and less expensive.

Referring next to the guiding apparatus 18, the guide block body 34 as shown in FIGS. 10 and 11 is attached to a lifting and locating portion 102 which allows a user to properly position the guide block 20 along the belt end 14 relative to the fasteners 12 set for installation thereon. As seen best in FIG. 3, several spacers 104 are fixed to the anvil plate 60 at positions aligned between the sets of bushings 62 thereon. Pairs of arcuate hinge loops 105 that interconnect the fastener upper plate 56 with the lower plate fit between adjacent spacers 104 so as to properly position the fastener plates with the anvil plate 60, and specifically the plate apertures 32 with the anvil bushings 62. Transverse bores 106 are formed in the spacers 104 so as to be in alignment with each other for receiving an installation pin 108 therethrough about which the fastener loops 105 also extend. Every other spacer 104 is enlarged and includes an annular portion 110 that is positioned beyond the U-channel base member 58 and which define a vertical bore 112 extending therethrough.

The guide block lifting and locating portion 102 includes a plate portion 114 that is located in a notch 115 in the block body 34 intermediate the upper surface 36 and lower surface 54 thereof for being attached thereto, such as by welding. As can be seen in FIG. 13, the plate portion 114 extends out from one side of the block body 34 generally parallel to the surfaces 36 and 54 thereof. A generally U-shaped handle 116 projects upwardly from the plate portion 114, as can be seen in FIG. 13. A pair of depending posts 118 project downwardly from the plate portion 114. The posts 118 are spaced from each other so as to correspond to the spacing between the spacers 104 including annular portions 110. Further, the posts 118 are sized for a sliding fit in the bores 112 of the annular portions 110.

Accordingly, a user lifts the guiding apparatus 18 via handle 116 and positions the guide block 20 over the four fasteners 12 to be riveted to the belt end 14. Then, the user lowers the apparatus 18 so that the posts 118 slide in the vertical bores 112 of the spacers 104 therebelow until the lower surface 54 of the block body 34 rests on the upper plate 56 of the fasteners 12. Thereafter, the user loads the rivets 24 in the guide block bores 22 via the collated strip 90 and utilizes the power tool apparatus 16 to attach the fasteners 12 to the belt ends 14, as has been previously described herein.

Figure 18:
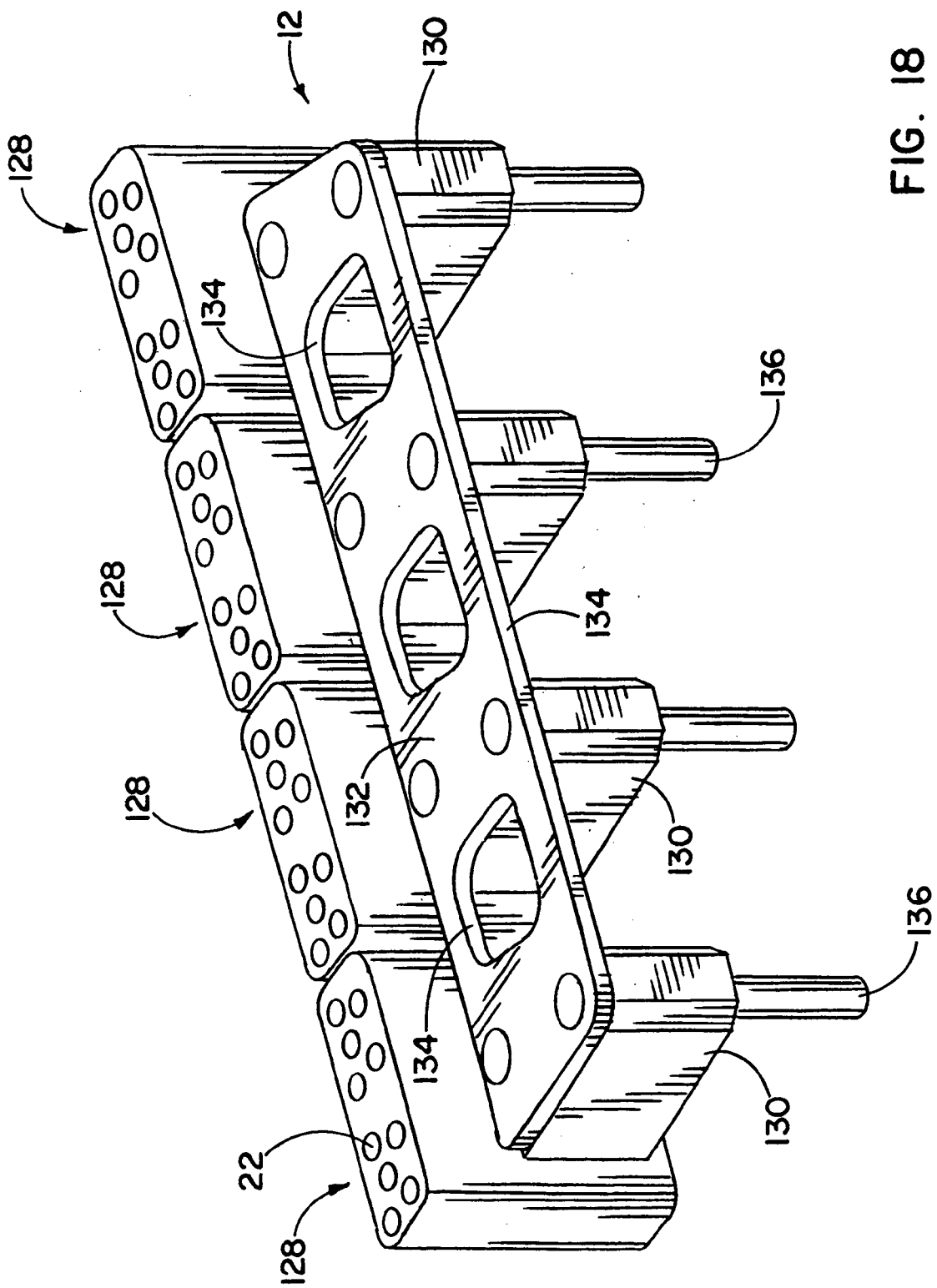
FIG. 18 is a perspective view of a guide block assembly.

Referring next to FIG. 18, a guide block assembly 126 is illustrated. The guide block assembly 126 preferably has four block bodies 128 each provided with two sets of through bores 22 in which two corresponding sets of rivets 24 are loaded. As illustrated, each set of through bores 22 includes five through bores 22 so that each block body has ten through bores 22 and thus the entire assembly 126 has forty through bores 22. The number of rivets 24 used per fastener 12 can vary widely. For example for hinged fasteners 12, besides the illustrated five rivet pattern, patterns using three, five and eight rivets can be employed. For solid plate fasteners extending across both belt ends, the number of rivets 24 per set can be fourteen, for example. A corresponding number of throughbores 22 will be provided for two sets of rivets 24 in each block body 128. Accordingly, the illustrated assembly 126 is capable of receiving twice as may rivets 24 as the block body 34 of previously-described guiding apparatus 18, and thus is twice as wide. It has been found that the extra width provided by the guide block assembly 126 is advantageous during riveting operations as it enhances the stability of the assembly 126 as the block bodies 128 rest on the upper plates 56 of the fasteners 12.

In particular, when the power tool 16 is located so that its nose end is registered in one of the outermost bores 22 of an outer block body 128 for instance, the wider assembly 126 is less likely to tip or cock during riveting. Any shifting of the block bodies 126 in this manner increases the likelihood of misfires including the potential for damage to the drive rod 38, the block bodies 128, the rivets 24, and/or the fastener 12, as well as improper riveting of the fasteners 12 to the conveyor belt ends 14. The present double-wide assembly 126 of guide block bodies 128 substantially assists in avoiding these types of problems during riveting operations.

The guide block assembly 126 also provides cost advantages in its manufacture over the guiding apparatus 18 which has its block body 34 formed as a machined part. In the block assembly 126, the block bodies 128 are preferably formed as powder metal parts. In this regard, the bodies 128 are formed in a die press and then the pressed base part is sintered and heat treated to achieve the final guide bodies 128 of the hardness desired for the drive rod and rivet guiding functions as previously described. However, because the bodies 128 are formed with relatively small size through bores 22, it is undesirable to employ unduly high compaction forces in the formation of the base part as this creates difficulty in stripping the pins from the bores 22 when opening the press. Preferably, the press employs approximately 250 tons of compaction force to form the pressed base of the block bodies 128.

The design and material selection for the block bodies 128 also plays a role in being able to use the relatively small tonnage press in the manufacturing process for the block bodies 128. The powdered metal also includes an additive that is introduced during sintering for increased density and lubricity of the finished part. The preferred material is a copper infiltrated steel designated FX-2008-90HT pursuant to MPIF (Metal Powder Industries Federation) Standard 35. Accordingly, the preferred powder metal block bodies 128 herein are able to provide the performance necessary for the present power applicator system 10 while also lowering unit costs for these parts in comparison to machined parts.

Continuing reference to FIG. 18, the block bodies 128 each have a wedge-shaped extension 130 to which a plate member 132 is secured to interconnect the block bodies 128 together. The plate member 132 has window openings 134 spaced therealong generally aligned between adjacent block bodies 128. The openings 134 provide gripping locations so that the plate member 132 serves as a handle for the assembly 126. Locator posts 136 depend from the free end of the extension portions 130 for fitting in the vertical bores 112 of the enlarged spacers 104 in a manner similar to posts 118, as previously has been described.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A system for applying conveyor belt fasteners to belt ends, the system comprising:
a pneumatic power tool having a barrel and a drive rod including upper and lower ends thereof in the barrel;
a piston of the pneumatic power tool sized to slidingly fit in the barrel and being secured to the upper end of the drive rod;
an actuator of the pneumatic power tool that is operable to supply compressed air directly to the piston;
a stop member fixed in the barrel adjacent a lower end thereof to keep the piston in the barrel and to be engaged by the piston upon operation of the tool actuator;
a guide block having multiple through bores, with the through bores configured to receive the drive rod advanced out from the barrel and then into one of the guide block bores upon operation of the actuator; and
rivets received in the guide block bores such that there are multiple rivets each received in a corresponding one of the multiple through bores of the guide block prior to operation of the actuator and to be driven out from the bores via operation of the power tool actuator causing the drive rod to advance in one of the bores so that the drive rod lower end initially impacts against the rivet in the one bore outside of the tool barrel.

2. The system of claim 1 wherein the guide block is of a stiff, rigid material to provide support to the drive rod advancing and impacting the rivets in the guide bores thereof.

3. The system of claim 1 wherein the power tool includes a nose having an opening through which the drive rod is driven upon power tool operation to extend out from the nose of the tool for impacting the rivets in the guide block bores.

4. The system of claim 3 wherein the tool nose and the guide block bores are configured to allow the nose to register in the bores so that the tool and guide block cooperate to support the drive rod for substantially the entire drive stroke thereof.

5. The system of claim 3 wherein the guide block bores have a large diameter upper portion in which the tool nose is received and a smaller diameter portion configured for receiving the rivets and guiding the rivets for being driven out of the bores.

6. The system of claim 1 wherein the guide block bores have a large diameter upper portion and a smaller diameter portion configured for receiving the rivets therein.

7. The system of claim 6 wherein the guide block bores include a tapered lead-in surface portion between the large and smaller diameter bore portions for guiding the rivets inserted into the large diameter proximal portion into the smaller diameter portion.

8. The system of claim 7 wherein the rivets include an enlarged diameter guide member thereon that tightly fits into the smaller diameter portion of the bores.

9. The system of claim 8 wherein the guide block has the bores arranged in a predetermined pattern, and
a plate that collates the rivets in a pattern that substantially matches the bore pattern with the rivets releasably held by the plate for being inserted into the bores.

10. The system of claim 1 wherein the guide block includes upper and lower surfaces to which the bores open, and the drive rod and guide bores are sized so that with the tool engaged in a predetermined orientation to the block the drive rod will be driven through the bores to project beyond the guide block lower surface by a predetermined amount selected to substantially avoid damage to the driven rivets.

11. The system of claim 10 wherein the predetermined amount is less than approximately 0.100 inch.

12. The system of claim 1 wherein the power tool generates a force of approximately 50,000 lbs. at the impact of the drive rod with the rivets.

13. A system for applying conveyor belt fasteners to belt ends, the system comprising:
a pneumatic power tool having a nose and a drive rod that is driven to extend out from the nose upon power tool operation for directly driving rivets of conveyor belt fasteners with the power tool drive rod;
a piston of the pneumatic power tool directly connected to the drive rod and being exclusively driven in the tool by compressed air; and
a guide block having a substantially rigid body including multiple guide bores formed therethrough in which attachment members are received such that there are multiple attachment members each received in a corresponding one of the multiple guide bores of the guide block prior to operation of the tool with tool operation causing the drive rod to extend out from the tool nose to be supported in one of the guide bores for driving the attachment member therein out therefrom.

14. The system of claim 13 wherein the guide block rigid body is of metallic material.

15. The system of claim 13 wherein the tool nose and the guide block bores are configured to allow the nose to fit in the bores.

16. The system of claim 15 wherein the guide bores have a large diameter upper portion for receiving the nose, and a small diameter portion in which the drive rod is supported.

17. The system of claim 15 wherein the tool includes a shoulder surface of the nose that engages the block to the limit the nose insertion depth in the guide block bores.

18. The system of claim 17 wherein the tool includes a safety that enables tool operation with the shoulder surface in substantial flush engagement with the block.

19. The system of claim 13 wherein the drive rod and the guide bores are sized so that at a maximum advanced position of the rod the rod projects out from a distal end of the bore by a predetermined amount selected to substantially avoid damage to the driven rivet and to limit deformation of an upper plate of the belt fastener.

20. The system of claim 19 wherein the predetermined amount is below approximately 0.100 inch.

* * * * *